United States Patent
Liu et al.

(10) Patent No.: US 8,559,490 B2
(45) Date of Patent: *Oct. 15, 2013

(54) APPARATUS AND METHOD FOR REMOVING COMMON PHASE ERROR IN A DVB-T/H RECEIVER

(75) Inventors: Peng Liu, Beijing (CN); Jilin Zou, Beijing (CN); Li Zou, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 444 days.

This patent is subject to a terminal disclaimer.

(21) Appl. No.: 12/452,411

(22) PCT Filed: Jun. 29, 2007

(86) PCT No.: PCT/CN2007/002032
§ 371 (c)(1),
(2), (4) Date: Dec. 29, 2009

(87) PCT Pub. No.: WO2009/003305
PCT Pub. Date: Jan. 8, 2009

(65) Prior Publication Data
US 2010/0142658 A1   Jun. 10, 2010

(51) Int. Cl.
*H04B 3/46* (2006.01)
*H04B 17/00* (2006.01)
*H04Q 1/20* (2006.01)

(52) U.S. Cl.
USPC .......................................... 375/224; 375/316

(58) Field of Classification Search
USPC ......... 375/259–260, 316, 340, 346, 350, 224, 375/226, 371; 370/208–210
See application file for complete search history.

(56) References Cited

U.S. PATENT DOCUMENTS

| | | |
|---|---|---|
| 5,184,134 A | 2/1993 | Niho et al. |
| 5,959,965 A | 9/1999 | Ohkubo et al. |
| 6,130,922 A | 10/2000 | Stott et al. |
| 6,240,146 B1 | 5/2001 | Stott et al. |
| 6,618,352 B1 | 9/2003 | Shirakata et al. |
| 7,227,834 B1 * | 6/2007 | Barton et al. ................ 370/208 |
| 7,668,246 B2 * | 2/2010 | Zhidkov et al. .............. 375/260 |
| 7,684,501 B2 * | 3/2010 | Liu et al. ...................... 375/260 |
| 2002/0017948 A1 | 2/2002 | Hyakudai et al. |

(Continued)

FOREIGN PATENT DOCUMENTS

| | | |
|---|---|---|
| CN | 1574818 | 2/2005 |
| CN | 1574826 | 2/2005 |

(Continued)

OTHER PUBLICATIONS

Peng et al.: "A Common Phase Error Cancellation Scheme of OFDM in Severe Channel", pp. 1-9, May 2005.

(Continued)

*Primary Examiner* — Jean B Corrielus
(74) *Attorney, Agent, or Firm* — Robert D. Shedd; Joseph J. Opalach

(57) ABSTRACT

A receiver is a Digital Video Broadcasting-Terrestrial/Handheld (DVB-T/H) receiver. The DVB-T/H receiver comprises a phase error corrector and a channel estimation and equalization element. The phase error corrector rotates a signal in accordance with an estimate of a phase error, e.g., CPE, which is determined as a function of channel state information (CSI) provided by the channel estimation and equalization element.

16 Claims, 19 Drawing Sheets

(56) References Cited

U.S. PATENT DOCUMENTS

| | | | |
|---|---|---|---|
| 2002/0106009 A1 | 8/2002 | Harrison | |
| 2003/0026371 A1* | 2/2003 | Laroia et al. | 375/362 |
| 2003/0108127 A1* | 6/2003 | Eilts et al. | 375/340 |
| 2003/0128660 A1* | 7/2003 | Ito et al. | 370/210 |
| 2004/0008618 A1 | 1/2004 | Shirakata et al. | |
| 2004/0141457 A1 | 7/2004 | Seo et al. | |
| 2004/0196915 A1* | 10/2004 | Gupta | 375/260 |
| 2004/0240376 A1 | 12/2004 | Wang et al. | |
| 2005/0013327 A1* | 1/2005 | Koyanagi | 370/535 |
| 2005/0078599 A1 | 4/2005 | Zhidkov et al. | |
| 2005/0207334 A1* | 9/2005 | Hadad | 370/203 |
| 2005/0286649 A1 | 12/2005 | Redfern | |
| 2006/0159189 A1* | 7/2006 | Balakrishnan et al. | 375/260 |
| 2006/0165187 A1 | 7/2006 | Troya | |
| 2006/0176802 A1* | 8/2006 | Ko et al. | 370/208 |
| 2006/0182015 A1 | 8/2006 | Kim | |
| 2006/0198472 A1* | 9/2006 | Nakamura et al. | 375/343 |
| 2006/0222096 A1* | 10/2006 | Guo et al. | 375/260 |
| 2006/0239178 A1* | 10/2006 | Svensson et al. | 370/208 |
| 2006/0285599 A1 | 12/2006 | Seki et al. | |
| 2007/0002981 A1* | 1/2007 | Gaikwad et al. | 375/346 |
| 2007/0268976 A1* | 11/2007 | Brink et al. | 375/260 |
| 2008/0008258 A1* | 1/2008 | Tanabe | 375/267 |
| 2008/0118006 A1 | 5/2008 | Krishnan et al. | |
| 2008/0219144 A1* | 9/2008 | Brehler et al. | 370/203 |
| 2008/0219332 A1* | 9/2008 | Brehler | 375/219 |
| 2010/0119013 A1 | 5/2010 | Liu et al. | |

FOREIGN PATENT DOCUMENTS

| | | |
|---|---|---|
| JP | 2000049747 | 2/2000 |
| JP | 2001044963 | 2/2001 |
| JP | 2001292124 | 10/2001 |
| JP | 2001308821 | 11/2001 |
| JP | 2002026866 | 1/2002 |
| JP | 2002261729 | 9/2002 |
| JP | 2004007280 | 1/2004 |
| JP | 2004007439 | 1/2004 |
| JP | 2006211667 | 8/2006 |
| JP | 2010532114 | 9/2010 |
| WO | WO2005015813 | 2/2005 |

OTHER PUBLICATIONS

Stott.:"The Effects of Phase Noise in COFDM", EBU Technical Review, 1998, pp. 1-22.

"Digital Video Broadcasting; Transmission System for Handheld Terminals", ETSI EN 302 304 V1.1.1., European Standard (Telecommunication Series, Nov. 2004 pp. 1-14.

Gholami et al.:"A New Method of Phase Noise Compensation in OFDM", 2003 IEEE, pp. 3443-3446.

Liu et al.:"Compensation of Phase Noise in OFDM Systems using an ICI Reduction Scheme", IEEE Transactions on Broadcasting, vol. 50, No. 4, Dec. 2004, pp. 399-407.

Munier et al.:"Receiver Algorithms for OFDM Systems in Phase Noise AWGN", 2004 IEEE, pp. 1998-2002.

Muschallik.:"Influence of RF Oscillators on an OFDM Signal", THAM 9.2, Thomson Consumer Electronics, Villingen, Germany, 1995 IEEE, p. 148.

"Digital Video Bradcasting; Framing Structure, Channel coding and Modulation for Digital Terrestrial Television", ETSI EN 300 744 V1.5.1, Jun. 2004, pp. 1-64.

Search Report Dated Apr. 10, 2008, PCT/CN2007/002032.

* cited by examiner

FIG. 2 *Prior Art*

FIG. 6
Table One

| $k=1$ | | | | | | | | | | | | | | | $k=16$ |
|---|---|---|---|---|---|---|---|---|---|---|---|---|---|---|---|
| 1024 | 0 | 1280 | 256 | 1536 | 512 | 1792 | 768 | 1088 | 64 | 1344 | 320 | 1600 | 576 | 1856 | 832 |
| 1152 | 128 | 1408 | 384 | 1664 | 640 | 1920 | 896 | 1216 | 192 | 1472 | 448 | 1728 | 704 | 1984 | 960 |
| 1040 | 16 | 1296 | 272 | 1552 | 528 | 1808 | 784 | 1104 | 80 | 1360 | 336 | 1616 | 592 | 1872 | 848 |
| 1168 | 144 | 1424 | 400 | 1680 | 656 | 1936 | 912 | 1232 | 208 | 1488 | 464 | 1744 | 720 | 2000 | 976 |
| 1056 | 32 | 1312 | 288 | 1568 | 544 | 1824 | 800 | 1120 | 96 | 1376 | 352 | 1632 | 608 | 1888 | 864 |
| 1184 | 160 | 1440 | 416 | 1696 | 672 | 1952 | 928 | 1248 | 224 | 1504 | 480 | 1760 | 736 | 2016 | 992 |
| 1072 | 48 | 1328 | 304 | 1584 | 560 | 1840 | 816 | 1136 | 112 | 1392 | 368 | 1648 | 624 | 1904 | 880 |
| 1200 | 176 | 1456 | 432 | 1712 | 688 | 1968 | 944 | 1264 | 240 | 1520 | 496 | 1776 | 752 | 2032 | 1008 |
| 1028 | 4 | 1284 | 260 | 1540 | 516 | 1796 | 772 | 1092 | 68 | 1348 | 324 | 1604 | 580 | 1860 | 836 |
| 1156 | 132 | 1412 | 388 | 1668 | 644 | 1924 | 900 | 1220 | 196 | 1476 | 452 | 1732 | 708 | 1988 | 964 |
| 1044 | 20 | 1300 | 276 | 1556 | 532 | 1812 | 788 | 1108 | 84 | 1364 | 340 | 1620 | 596 | 1876 | 852 |
| 1172 | 148 | 1428 | 404 | 1684 | 660 | 1940 | 916 | 1236 | 212 | 1492 | 468 | 1748 | 724 | 2004 | 980 |
| 1060 | 36 | 1316 | 292 | 1572 | 548 | 1828 | 804 | 1124 | 100 | 1380 | 356 | 1636 | 612 | 1892 | 868 |
| 1188 | 164 | 1444 | 420 | 1700 | 676 | 1956 | 932 | 1252 | 228 | 1508 | 484 | 1764 | 740 | 2020 | 996 |
| 1076 | 52 | 1332 | 308 | 1588 | 564 | 1844 | 820 | 1140 | 116 | 1396 | 372 | 1652 | 628 | 1908 | 884 |
| | | | | | | | | | | | | | | | $k=240$ |

FIG. 7
Table One (continued)

| k = 241 | | | | | | | | | | k = 256 |
|---|---|---|---|---|---|---|---|---|---|---|
| 1204 | 180 | 1460 | 436 | 1716 | 692 | 1972 | 948 | 1268 | 244 | 1524 | 500 | 1780 | 756 | 2036 | 1012 |
| 1032 | 8 | 1288 | 264 | 1544 | 520 | 1800 | 776 | 1096 | 72 | 1352 | 328 | 1608 | 584 | 1864 | 840 |
| 1160 | 136 | 1416 | 392 | 1672 | 648 | 1928 | 904 | 1224 | 200 | 1480 | 456 | 1736 | 712 | 1992 | 968 |
| 1048 | 24 | 1304 | 280 | 1560 | 536 | 1816 | 792 | 1112 | 88 | 1368 | 344 | 1624 | 600 | 1880 | 856 |
| 1176 | 152 | 1432 | 408 | 1688 | 664 | 1944 | 920 | 1240 | 216 | 1496 | 472 | 1752 | 728 | 2008 | 984 |
| 1064 | 40 | 1320 | 296 | 1576 | 552 | 1832 | 808 | 1128 | 104 | 1384 | 360 | 1640 | 616 | 1896 | 872 |
| 1192 | 168 | 1448 | 424 | 1704 | 680 | 1960 | 936 | 1256 | 232 | 1512 | 488 | 1768 | 744 | 2024 | 1000 |
| 1080 | 56 | 1336 | 312 | 1592 | 568 | 1848 | 824 | 1144 | 120 | 1400 | 376 | 1656 | 632 | 1912 | 888 |
| 1208 | 184 | 1464 | 440 | 1720 | 696 | 1976 | 952 | 1272 | 248 | 1528 | 504 | 1784 | 760 | 2040 | 1016 |
| 1036 | 12 | 1292 | 268 | 1548 | 524 | 1804 | 780 | 1100 | 76 | 1356 | 332 | 1612 | 588 | 1868 | 844 |
| 1164 | 140 | 1420 | 396 | 1676 | 652 | 1932 | 908 | 1228 | 204 | 1484 | 460 | 1740 | 716 | 1996 | 972 |
| 1052 | 28 | 1308 | 284 | 1564 | 540 | 1820 | 796 | 1116 | 92 | 1372 | 348 | 1628 | 604 | 1884 | 860 |
| 1180 | 156 | 1436 | 412 | 1692 | 668 | 1948 | 924 | 1244 | 220 | 1500 | 476 | 1756 | 732 | 2012 | 988 |
| 1068 | 44 | 1324 | 300 | 1580 | 556 | 1836 | 812 | 1132 | 108 | 1388 | 364 | 1644 | 620 | 1900 | 876 |
| 1196 | 172 | 1452 | 428 | 1708 | 684 | 1964 | 940 | 1260 | 236 | 1516 | 492 | 1772 | 748 | 2028 | 1004 |
| | | | | | | | | | | | | | | | k = 480 |

FIG. 8
Table One (continued)

| $k=481$ | | | | | | | | | | | | | | | $k=496$ |
|---|---|---|---|---|---|---|---|---|---|---|---|---|---|---|---|
| 1084 | 60 | 1340 | 316 | 1596 | 572 | 1852 | 828 | 1148 | 124 | 1404 | 380 | 1660 | 636 | 1916 | 892 |
| 1212 | 188 | 1468 | 444 | 1724 | 700 | 1980 | 956 | 1276 | 252 | 1532 | 508 | 1788 | 764 | 2044 | 1020 |
| 1025 | 1 | 1281 | 257 | 1537 | 513 | 1793 | 769 | 1089 | 65 | 1345 | 321 | 1601 | 577 | 1857 | 833 |
| 1153 | 129 | 1409 | 385 | 1665 | 641 | 1921 | 897 | 1217 | 193 | 1473 | 449 | 1729 | 705 | 1985 | 961 |
| 1041 | 17 | 1297 | 273 | 1553 | 529 | 1809 | 785 | 1105 | 81 | 1361 | 337 | 1617 | 593 | 1873 | 849 |
| 1169 | 145 | 1425 | 401 | 1681 | 657 | 1937 | 913 | 1233 | 209 | 1489 | 465 | 1745 | 721 | 2001 | 977 |
| 1057 | 33 | 1313 | 289 | 1569 | 545 | 1825 | 801 | 1121 | 97 | 1377 | 353 | 1633 | 609 | 1889 | 865 |
| 1185 | 161 | 1441 | 417 | 1697 | 673 | 1953 | 929 | 1249 | 225 | 1505 | 481 | 1761 | 737 | 2017 | 993 |
| 1073 | 49 | 1329 | 305 | 1585 | 561 | 1841 | 817 | 1137 | 113 | 1393 | 369 | 1649 | 625 | 1905 | 881 |
| 1201 | 177 | 1457 | 433 | 1713 | 689 | 1969 | 945 | 1265 | 241 | 1521 | 497 | 1777 | 753 | 2033 | 1009 |
| 1029 | 5 | 1285 | 261 | 1541 | 517 | 1797 | 773 | 1093 | 69 | 1349 | 325 | 1605 | 581 | 1861 | 837 |
| 1157 | 133 | 1413 | 389 | 1669 | 645 | 1925 | 901 | 1221 | 197 | 1477 | 453 | 1733 | 709 | 1989 | 965 |
| 1045 | 21 | 1301 | 277 | 1557 | 533 | 1813 | 789 | 1109 | 85 | 1365 | 341 | 1621 | 597 | 1877 | 853 |
| 1173 | 149 | 1429 | 405 | 1685 | 661 | 1941 | 917 | 1237 | 213 | 1493 | 469 | 1749 | 725 | 2005 | 981 |
| 1061 | 37 | 1317 | 293 | 1573 | 549 | 1829 | 805 | 1125 | 101 | 1381 | 357 | 1637 | 613 | 1893 | 869 |
| | | | | | | | | | | | | | | | $k=720$ |

FIG. 9
Table One (continued)

| k=721 | | | | | | | | | | | | | | | k=736 |
|---|---|---|---|---|---|---|---|---|---|---|---|---|---|---|---|
| 1189 | 165 | 1445 | 421 | 1701 | 677 | 1957 | 933 | 1253 | 229 | 1509 | 485 | 1765 | 741 | 2021 | 997 |
| 1077 | 53 | 1333 | 309 | 1589 | 565 | 1845 | 821 | 1141 | 117 | 1397 | 373 | 1653 | 629 | 1909 | 885 |
| 1205 | 181 | 1461 | 437 | 1717 | 693 | 1973 | 949 | 1269 | 245 | 1525 | 501 | 1781 | 757 | 2037 | 1013 |
| 1033 | 9 | 1289 | 265 | 1545 | 521 | 1801 | 777 | 1097 | 73 | 1353 | 329 | 1609 | 585 | 1865 | 841 |
| 1161 | 137 | 1417 | 393 | 1673 | 649 | 1929 | 905 | 1225 | 201 | 1481 | 457 | 1737 | 713 | 1993 | 969 |
| 1049 | 25 | 1305 | 281 | 1561 | 537 | 1817 | 793 | 1113 | 89 | 1369 | 345 | 1625 | 601 | 1881 | 857 |
| 1177 | 153 | 1433 | 409 | 1689 | 665 | 1945 | 921 | 1241 | 217 | 1497 | 473 | 1753 | 729 | 2009 | 985 |
| 1065 | 41 | 1321 | 297 | 1577 | 553 | 1833 | 809 | 1129 | 105 | 1385 | 361 | 1641 | 617 | 1897 | 873 |
| 1193 | 169 | 1449 | 425 | 1705 | 681 | 1961 | 937 | 1257 | 233 | 1513 | 489 | 1769 | 745 | 2025 | 1001 |
| 1081 | 57 | 1337 | 313 | 1593 | 569 | 1849 | 825 | 1145 | 121 | 1401 | 377 | 1657 | 633 | 1913 | 889 |
| 1209 | 185 | 1465 | 441 | 1721 | 697 | 1977 | 953 | 1273 | 249 | 1529 | 505 | 1785 | 761 | 2041 | 1017 |
| 1037 | 13 | 1293 | 269 | 1549 | 525 | 1805 | 781 | 1101 | 77 | 1357 | 333 | 1613 | 589 | 1869 | 845 |
| 1165 | 141 | 1421 | 397 | 1677 | 653 | 1933 | 909 | 1229 | 205 | 1485 | 461 | 1741 | 717 | 1997 | 973 |
| 1053 | 29 | 1309 | 285 | 1565 | 541 | 1821 | 797 | 1117 | 93 | 1373 | 349 | 1629 | 605 | 1885 | 861 |
| 1181 | 157 | 1437 | 413 | 1693 | 669 | 1949 | 925 | 1245 | 221 | 1501 | 477 | 1757 | 733 | 2013 | 989 k=960 |

FIG. 10
Table One (continued)

| | | | | | | | | | | | | | | | |
|---|---|---|---|---|---|---|---|---|---|---|---|---|---|---|---|
| 1069 | 45 | 1325 | 301 | 1581 | 557 | 1837 | 813 | 1133 | 109 | 1389 | 365 | 1645 | 621 | 1901 | 877 |
| 1197 | 173 | 1453 | 429 | 1709 | 685 | 1965 | 941 | 1261 | 237 | 1517 | 493 | 1773 | 749 | 2029 | 1005 |
| 1085 | 61 | 1341 | 317 | 1597 | 573 | 1853 | 829 | 1149 | 125 | 1405 | 381 | 1661 | 637 | 1917 | 893 |
| 1213 | 189 | 1469 | 445 | 1725 | 701 | 1981 | 957 | 1277 | 253 | 1533 | 509 | 1789 | 765 | 2045 | 1021 |
| 1026 | 2 | 1282 | 258 | 1538 | 514 | 1794 | 770 | 1090 | 66 | 1346 | 322 | 1602 | 578 | 1858 | 834 |
| 1154 | 130 | 1410 | 386 | 1666 | 642 | 1922 | 898 | 1218 | 194 | 1474 | 450 | 1730 | 706 | 1986 | 962 |
| 1042 | 18 | 1298 | 274 | 1554 | 530 | 1810 | 786 | 1106 | 82 | 1362 | 338 | 1618 | 594 | 1874 | 850 |
| 1170 | 146 | 1426 | 402 | 1682 | 658 | 1938 | 914 | 1234 | 210 | 1490 | 466 | 1746 | 722 | 2002 | 978 |
| 1058 | 34 | 1314 | 290 | 1570 | 546 | 1826 | 802 | 1122 | 98 | 1378 | 354 | 1634 | 610 | 1890 | 866 |
| 1186 | 162 | 1442 | 418 | 1698 | 674 | 1954 | 930 | 1250 | 226 | 1506 | 482 | 1762 | 738 | 2018 | 994 |
| 1074 | 50 | 1330 | 306 | 1586 | 562 | 1842 | 818 | 1138 | 114 | 1394 | 370 | 1650 | 626 | 1906 | 882 |
| 1202 | 178 | 1458 | 434 | 1714 | 690 | 1970 | 946 | 1266 | 242 | 1522 | 498 | 1778 | 754 | 2034 | 1010 |
| 1030 | 6 | 1286 | 262 | 1542 | 518 | 1798 | 774 | 1094 | 70 | 1350 | 326 | 1606 | 582 | 1862 | 838 |
| 1158 | 134 | 1414 | 390 | 1670 | 646 | 1926 | 902 | 1222 | 198 | 1478 | 454 | 1734 | 710 | 1990 | 966 |
| 1046 | 22 | 1302 | 278 | 1558 | 534 | 1814 | 790 | 1110 | 86 | 1366 | 342 | 1622 | 598 | 1878 | 854 |

First column starts at $k = 961$; columns continue through $k = 976$, ..., ending at $k = 1200$.

FIG. 11
Table One (continued)

| $k=1201$ | | | | | | | | | | | | $k=1216$ |
|---|---|---|---|---|---|---|---|---|---|---|---|---|
| 1174 | 150 | 1430 | 406 | 1686 | 662 | 1942 | 918 | 1238 | 214 | 1494 | 470 | 1750 | 726 | 2006 | 982 |
| 1062 | 38 | 1318 | 294 | 1574 | 550 | 1830 | 806 | 1126 | 102 | 1382 | 358 | 1638 | 614 | 1894 | 870 |
| 1190 | 166 | 1446 | 422 | 1702 | 678 | 1958 | 934 | 1254 | 230 | 1510 | 486 | 1766 | 742 | 2022 | 998 |
| 1078 | 54 | 1334 | 310 | 1590 | 566 | 1846 | 822 | 1142 | 118 | 1398 | 374 | 1654 | 630 | 1910 | 886 |
| 1206 | 182 | 1462 | 438 | 1718 | 694 | 1974 | 950 | 1270 | 246 | 1526 | 502 | 1782 | 758 | 2038 | 1014 |
| 1034 | 10 | 1290 | 266 | 1546 | 522 | 1802 | 778 | 1098 | 74 | 1354 | 330 | 1610 | 586 | 1866 | 842 |
| 1162 | 138 | 1418 | 394 | 1674 | 650 | 1930 | 906 | 1226 | 202 | 1482 | 458 | 1738 | 714 | 1994 | 970 |
| 1050 | 26 | 1306 | 282 | 1562 | 538 | 1818 | 794 | 1114 | 90 | 1370 | 346 | 1626 | 602 | 1882 | 858 |
| 1178 | 154 | 1434 | 410 | 1690 | 666 | 1946 | 922 | 1242 | 218 | 1498 | 474 | 1754 | 730 | 2010 | 986 |
| 1066 | 42 | 1322 | 298 | 1578 | 554 | 1834 | 810 | 1130 | 106 | 1386 | 362 | 1642 | 618 | 1898 | 874 |
| 1194 | 170 | 1450 | 426 | 1706 | 682 | 1962 | 938 | 1258 | 234 | 1514 | 490 | 1770 | 746 | 2026 | 1002 |
| 1082 | 58 | 1338 | 314 | 1594 | 570 | 1850 | 826 | 1146 | 122 | 1402 | 378 | 1658 | 634 | 1914 | 890 |
| 1210 | 186 | 1466 | 442 | 1722 | 698 | 1978 | 954 | 1274 | 250 | 1530 | 506 | 1786 | 762 | 2042 | 1018 |
| 1038 | 14 | 1294 | 270 | 1550 | 526 | 1806 | 782 | 1102 | 78 | 1358 | 334 | 1614 | 590 | 1870 | 846 |
| 1166 | 142 | 1422 | 398 | 1678 | 654 | 1934 | 910 | 1230 | 206 | 1486 | 462 | 1742 | 718 | 1998 | 974 |
| | | | | | | | | | | | | | | | $k=1440$ |

FIG. 12
Table One (continued)

| k=1441 | | | | | | | | | | | k=1456 |
|---|---|---|---|---|---|---|---|---|---|---|---|
| 1054 | 30 | 1310 | 286 | 1566 | 542 | 1822 | 798 | 1118 | 94 | 1374 | 350 | 1630 | 606 | 1886 | 862 |
| 1182 | 158 | 1438 | 414 | 1694 | 670 | 1950 | 926 | 1246 | 222 | 1502 | 478 | 1758 | 734 | 2014 | 990 |
| 1070 | 46 | 1326 | 302 | 1582 | 558 | 1838 | 814 | 1134 | 110 | 1390 | 366 | 1646 | 622 | 1902 | 878 |
| 1198 | 174 | 1454 | 430 | 1710 | 686 | 1966 | 942 | 1262 | 238 | 1518 | 494 | 1774 | 750 | 2030 | 1006 |
| 1086 | 62 | 1342 | 318 | 1598 | 574 | 1854 | 830 | 1150 | 126 | 1406 | 382 | 1662 | 638 | 1918 | 894 |
| 1214 | 190 | 1470 | 446 | 1726 | 702 | 1982 | 958 | 1278 | 254 | 1534 | 510 | 1790 | 766 | 2046 | 1022 |
| 1027 | 3 | 1283 | 259 | 1539 | 515 | 1795 | 771 | 1091 | 67 | 1347 | 323 | 1603 | 579 | 1859 | 835 |
| 1155 | 131 | 1411 | 387 | 1667 | 643 | 1923 | 899 | 1219 | 195 | 1475 | 451 | 1731 | 707 | 1987 | 963 |
| 1043 | 19 | 1299 | 275 | 1555 | 531 | 1811 | 787 | 1107 | 83 | 1363 | 339 | 1619 | 595 | 1875 | 851 |
| 1171 | 147 | 1427 | 403 | 1683 | 659 | 1939 | 915 | 1235 | 211 | 1491 | 467 | 1747 | 723 | 2003 | 979 |
| 1059 | 35 | 1315 | 291 | 1571 | 547 | 1827 | 803 | 1123 | 99 | 1379 | 355 | 1635 | 611 | 1891 | 867 |
| 1187 | 163 | 1443 | 419 | 1699 | 675 | 1955 | 931 | 1251 | 227 | 1507 | 483 | 1763 | 739 | 2019 | 995 |
| 1075 | 51 | 1331 | 307 | 1587 | 563 | 1843 | 819 | 1139 | 115 | 1395 | 371 | 1651 | 627 | 1907 | 883 |
| 1203 | 179 | 1459 | 435 | 1715 | 691 | 1971 | 947 | 1267 | 243 | 1523 | 499 | 1779 | 755 | 2035 | 1011 |
| 1031 | 7 | 1287 | 263 | 1543 | 519 | 1799 | 775 | 1095 | 71 | 1351 | 327 | 1607 | 583 | 1863 | 839 | k=1680

FIG. 13
Table One (continued)

| $k=1681$ | | | | | | | | | | | | | | $k=1696$ | |
|---|---|---|---|---|---|---|---|---|---|---|---|---|---|---|---|
| 1159 | 135 | 1415 | 391 | 1671 | 647 | 1927 | 903 | 1223 | 199 | 1479 | 455 | 1735 | 711 | 1991 | 967 |
| 1047 | 23 | 1303 | 279 | 1559 | 535 | 1815 | 791 | 1111 | 87 | 1367 | 343 | 1623 | 599 | 1879 | 855 |
| 1175 | 151 | 1431 | 407 | 1687 | 663 | 1943 | 919 | 1239 | 215 | 1495 | 471 | 1751 | 727 | 2007 | 983 |
| 1063 | 39 | 1319 | 295 | 1575 | 551 | 1831 | 807 | 1127 | 103 | 1383 | 359 | 1639 | 615 | 1895 | 871 |
| 1191 | 167 | 1447 | 423 | 1703 | 679 | 1959 | 935 | 1255 | 231 | 1511 | 487 | 1767 | 743 | 2023 | 999 |
| 1079 | 55 | 1335 | 311 | 1591 | 567 | 1847 | 823 | 1143 | 119 | 1399 | 375 | 1655 | 631 | 1911 | 887 |
| 1207 | 183 | 1463 | 439 | 1719 | 695 | 1975 | 951 | 1271 | 247 | 1527 | 503 | 1783 | 759 | 2039 | 1015 |
| 1035 | 11 | 1291 | 267 | 1547 | 523 | 1803 | 779 | 1099 | 75 | 1355 | 331 | 1611 | 587 | 1867 | 843 |
| 1163 | 139 | 1419 | 395 | 1675 | 651 | 1931 | 907 | 1227 | 203 | 1483 | 459 | 1739 | 715 | 1995 | 971 |
| 1051 | 27 | 1307 | 283 | 1563 | 539 | 1819 | 795 | 1115 | 91 | 1371 | 347 | 1627 | 603 | 1883 | 859 |
| 1179 | 155 | 1435 | 411 | 1691 | 667 | 1947 | 923 | 1243 | 219 | 1499 | 475 | 1755 | 731 | 2011 | 987 |
| 1067 | 43 | 1323 | 299 | 1579 | 555 | 1835 | 811 | 1131 | 107 | 1387 | 363 | 1643 | 619 | 1899 | 875 |
| 1195 | 171 | 1451 | 427 | 1707 | 683 | 1963 | 939 | 1259 | 235 | 1515 | 491 | 1771 | 747 | 2027 | 1003 |
| 1083 | 59 | 1339 | 315 | 1595 | 571 | 1851 | 827 | 1147 | 123 | 1403 | 379 | 1659 | 635 | 1915 | 891 |
| 1211 | 187 | 1467 | 443 | 1723 | 699 | 1979 | 955 | 1275 | 251 | 1531 | 507 | 1787 | 763 | 2043 | 1019 |
| | | | | | | | | | | | | | | | $k=1920$ |

FIG. 14
Table One (continued)

| $k = 1921$ | | | | | | | | | | | | | | | $k = 1936$ |
|---|---|---|---|---|---|---|---|---|---|---|---|---|---|---|---|
| 1039 | 15 | 1295 | 271 | 1551 | 527 | 1807 | 783 | 1103 | 79 | 1359 | 335 | 1615 | 591 | 1871 | 847 |
| 1167 | 143 | 1423 | 399 | 1679 | 655 | 1935 | 911 | 1231 | 207 | 1487 | 463 | 1743 | 719 | 1999 | 975 |
| 1055 | 31 | 1311 | 287 | 1567 | 543 | 1823 | 799 | 1119 | 95 | 1375 | 351 | 1631 | 607 | 1887 | 863 |
| 1183 | 159 | 1439 | 415 | 1695 | 671 | 1951 | 927 | 1247 | 223 | 1503 | 479 | 1759 | 735 | 2015 | 991 |
| 1071 | 47 | 1327 | 303 | 1583 | 559 | 1839 | 815 | 1135 | 111 | 1391 | 367 | 1647 | 623 | 1903 | 879 |
| 1199 | 175 | 1455 | 431 | 1711 | 687 | 1967 | 943 | 1263 | 239 | 1519 | 495 | 1775 | 751 | 2031 | 1007 |
| 1087 | 63 | 1343 | 319 | 1599 | 575 | 1855 | 831 | 1151 | 127 | 1407 | 383 | 1663 | 639 | 1919 | 895 |
| 1215 | 191 | 1471 | 447 | 1727 | 703 | 1983 | 959 | 1279 | 255 | 1535 | 511 | 1791 | 767 | 2047 | 1023 |

Table Three

| 172 | 220 | 226 | 259 | 313 | 328 | 364 |
|---|---|---|---|---|---|---|
| 373 | 427 | 451 | 454 | 505 | 604 | 622 |
| 655 | 697 | 703 | 790 | 808 | 886 | 931 |
| 937 | 952 | 976 | 1045 | 1060 | 1090 | 1111 |
| 1114 | 1141 | 1156 | 1222 | 1273 | 1279 | 1282 |
| 1309 | 1312 | 1318 | 1378 | 1441 | 1495 | 1549 |
| 1663 | 1855 | 1876 | | | | |

Table Four

| 63 | 66 | 144 | 174 | 192 | 267 | 327 |
|---|---|---|---|---|---|---|
| 375 | 429 | 441 | 459 | 465 | 594 | 672 |
| 744 | 747 | 855 | 867 | 885 | 888 | 891 |
| 900 | 930 | 1026 | 1032 | 1098 | 1113 | 1176 |
| 1179 | 1191 | 1218 | 1263 | 1320 | 1485 | 1539 |
| 1563 | 1623 | 1704 | 1722 | 1875 | 1941 | 2022 |
| 2028 | 2037 | 2040 | | | | |

```
clc
clear all
load conti_pos.mat; %positions of continual pilots complying with the DVB-T standard in 2K mode
               %Table 2 FIG. 15;
load 2k_shift.txt; %Table 1, FFT output, FIGs. 6-14;

pilot_add171=(conti_pos-1)+172; %Table 3, FIGs. 15 and 16;
pilot_new=[];
k=1;
for i=1:2048
    for j=1:45
        if X2k_shift(i)==pilot_add171(j)
            pilot_new(k)=i;
            k=k+1;
        end
    end
end
pilot_new_2k=pilot_new-pilot_new(1); %Table 4, FIG. 16;
```

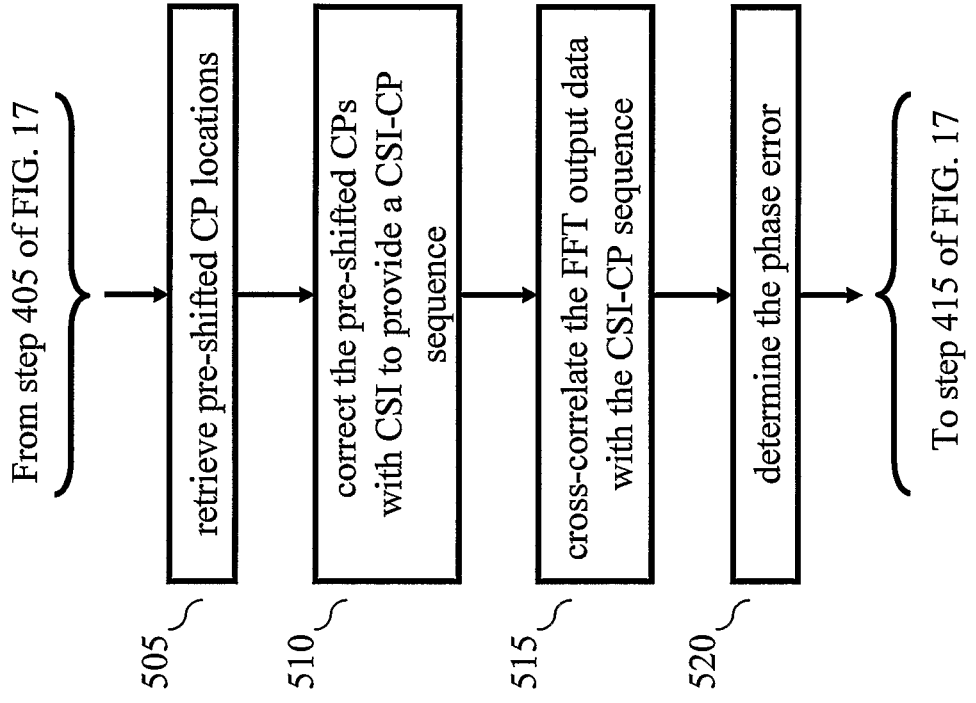

APPARATUS AND METHOD FOR REMOVING COMMON PHASE ERROR IN A DVB-T/H RECEIVER

CROSS-REFERENCE TO RELATED APPLICATIONS

This application is a 371 and claims the benefit, under 35 U.S.C. § 365 of International Application PCT/CN2007/002032, filed Jun. 29, 2007, which was published in accordance with PCT Article 21(2) on Jan. 8, 2009 in English.

BACKGROUND OF THE INVENTION

The present invention generally relates to communications systems and, more particularly, to wireless systems, e.g., terrestrial broadcast, cellular, Wireless-Fidelity (Wi-Fi), satellite, etc.

Digital Video Broadcasting-Terrestrial (DVB-T) (e.g., see ETSI EN 300 744 V1.4.1 (2001-01), *Digital Video Broadcasting (DVB); Framing structure, channel coding and modulation for digital terrestrial television*), is one of the four kinds of digital television (DTV) broadcasting standards in the world, and DVB-H is a standard for handheld applications based on DVB-T (also referred to herein as DVB-T/H). DVB-T uses Orthogonal Frequency Division Multiplexing (OFDM) technology, i.e., DVB-T uses a form of a multi-carrier transmission comprising many low symbol rate subcarriers that are orthogonal.

A DVB-T/H receiver comprises an antenna and a tuner. The antenna provides radio frequency (RF) signals to the tuner, which is tuned to a selected frequency range, or selected channel. The tuner downconverts the received RF signal in the selected channel to provide either an intermediate frequency (IF) signal or a baseband signal for further processing by the DVB-T/H receiver, e.g., to recover a television (TV) program for display to a user. Typically, a tuner performs downconversion with a mixer and a Voltage Controlled Oscillator (VCO). The VCO is an important element in the tuner. Unfortunately, the VCO is a main contributor of phase noise (PHN).

Generally, PHN is not a big problem for analog TV systems. However, for DTV systems using OFDM, the impact of PHN on receiver operation is much more significant. In particular, PHN introduces a common phase error (CPE), which causes a rotation of the signal constellation; and also creates an inter-carrier interference (ICI) term that adds to any channel noise. As a result, both CPE and ICI interfere with demodulation of the received DVB-T signal and, therefore, removal of PHN in a DVB-T/H receiver is very important.

With regard to CPE, a DVB-T receiver can estimate the CPE and correct for it by using pilots (predefined subcarriers (i.e., frequencies) having a given amplitude and phase) that are present in each OFDM symbol. In DVB-T there are two types of pilots: scattered pilots (SP) and continual pilots (CP). The continual pilots have fixed locations within OFDM symbols and are used for CPE removal.

A conventional CPE removal arrangement is shown in FIGS. 1 and 2. In DVB-T there are two modes of operation, a 2K mode—corresponding to the use of 2048 subcarriers—and an 8K mode—corresponding to the use of 8192 subcarriers. In this example, it is assumed that the receiver is operating in the 8K mode. Operation in the 2K mode is similar and not described herein. The CPE removal arrangement of FIG. 1 comprises Fast Fourier Transform (FFT) element 105, spectrum shift element 110, CPE removal element 115 and channel estimation and equalization (CHE) element 120. FFT element 105 processes a received baseband signal 104. The latter is provided by, e.g., a tuner (not shown) tuned to a selected RF channel. FFT element 105 transforms received baseband signal 104 from the time domain to the frequency domain and provides FFT output signal 106 to spectrum shift element 110. It should be noted that FFT output signal 106 represents complex signals having in-phase and quadrature components. Typically, FFT element 105 performs butterfly calculations as known in the art and provides reordered output data (8192 complex samples in an 8k mode of operation). As such, spectrum shift element 110 further processes FFT output signal 106 to rearrange, or shift, the FFT output data. In particular, spectrum shift element 110 buffers one OFDM symbol and tidies the subcarrier locations to comply with the above-mentioned DVB-T standard and also shifts the subcarriers from [0, 2π] to [−π, +π] to provide spectrum shifted signal 111. CPE removal element 115 processes spectrum shifted signal 111 to remove any CPE (described below) and provides a CPE corrected signal 116 to CHE element 120. CHE element 220 processes the CPE corrected signal 116 for (a) determining channel state information (CSI) for providing CSI signal 122; and (b) equalizing the received baseband signal to compensate for any transmission channel distortion for providing equalized signal 121. As known in the art, CSI signal 122 may be used for obtaining bit metrics for use in decoding (not shown in FIG. 1). Equalized signal 121 is further processed by the receiver to, e.g., recover content conveyed therein (audio, video, etc.) (also not shown in FIG. 1).

Turning now to FIG. 2, the operation of CPE removal element 115 is shown in more detail. CPE removal element 115 comprises: delay buffer 155, CP extractor 160, CP locations element 165, CP memory 170, complex conjugate multiplier 175, accumulator 180, phase calculator 185, phase accumulator and sin and cos calculator 190, and rotator (also referred to as a multiplier) 195. Delay buffer 155 stores one OFDM symbol in 8K mode and thus provides for a one OFDM symbol time delay for determining an estimate of the CPE. For the 8K mode of operation, the size of delay buffer 155 is 8192×2×N bits, where N is the bit length of the data and 2 represents the in-phase and quadrature components of the complex signals. The delayed symbol is applied to rotator 195 along with a CPE estimate signal 191. Rotator 195 corrects for the CPE by rotating the delayed symbol from delay buffer 155 in the opposite direction in accordance with CPE estimate signal 191 to provide CPE corrected signal 116.

In general, the arrangement shown in FIG. 2 operates such that CPE estimate signal 191 is determined from the autocorrelation of CPs occurring at different points in time.

In particular, CP extractor 160 extracts the CPs from spectrum shifted signal 111 at particular subcarriers as defined by CP locations element 165. The latter simply stores the CP locations as defined in the above-mentioned DVB-T standard for the 8K mode of operation (e.g., see Table 7, p. 29, of the above-mentioned DVB-T standard). The extracted CPs are provided both to CP memory 170 and complex conjugate multiplier 175. Memory 170 also provides a delay of one OFDM symbol. Complex conjugate multiplier 175 multiplies the complex conjugates of CPs having the same frequencies but occurring at two different points in time (i.e., neighboring OFDM symbols). The resulting products are averaged (via accumulator 180) from which a phase error is calculated (via phase calculator 185) for each OFDM symbol. Phase accumulator and sin and cos calculator 190 further accumulates the calculated phase errors for each OFDM symbol and determines an estimate of the CPE to provide CPE estimate signal 191, which is applied to rotator 195 to correct for CPE in the signal, as described above.

SUMMARY OF THE INVENTION

We have realized that it is possible to further improve the operation and efficiency of CPE removal in an OFDM-based receiver. In particular, and in accordance with the principles of the invention, a receiver performs phase error correction on a signal as a function of channel state information (CSI).

In an illustrative embodiment of the invention, a receiver is a DVB-T/H receiver. The DVB-T/H receiver comprises a phase error corrector and a channel estimation and equalization element. The phase error corrector rotates a signal in accordance with an estimate of a phase error, e.g., CPE, which is determined as a function of channel state information (CSI) provided by the channel estimation and equalization element.

In view of the above, and as will be apparent from reading the detailed description, other embodiments and features are also possible and fall within the principles of the invention.

BRIEF DESCRIPTION OF THE DRAWINGS

FIGS. 6-14 shows an illustrative spectrum shift index table associated with FFT element 205;

FIGS. 15 and 16 show continual pilot (CP) location tables related to phase corrector 215, which operates in accordance with the principles of the invention;

FIG. 17 shows an illustrative matlab program for converting Table 3 to Table 4 in accordance with Table 1; and FIGS. 18 and 19 show illustrative flow charts for use in a receiver in accordance with the principles of the invention.

DETAILED DESCRIPTION

Other than the inventive concept, the elements shown in the figures are well known and will not be described in detail. For example, other than the inventive concept, familiarity with Discrete Multitone (DMT) transmission (also referred to as Orthogonal Frequency Division Multiplexing (OFDM) or Coded Orthogonal Frequency Division Multiplexing (COFDM)) is assumed and not described herein. Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire), ATSC (Advanced Television Systems Committee) (ATSC), Digital Video Broadcasting (DVB) and the Chinese Digital Television System (GB) 20600-2006 (Digital Multimedia Broadcasting-Terrestrial/Handheld (DMB-T/H)) is assumed. Further information on DVB-T/H can be found in, e.g., ETSI EN 300 744 V1.4.1 (2001-01), *Digital Video Broadcasting (DVB); Framing structure, channel coding and modulation for digital terrestrial television*; and ETSI EN 302 304 V1.1.1 (2004-11), *Digital Video Broadcasting (DVB); Transmission System for Handheld Terminals (DVB-H)*. Likewise, other than the inventive concept, other transmission concepts such as eight-level vestigial sideband (8-VSB), Quadrature Amplitude Modulation (QAM), and receiver components such as a radio-frequency (RF) front-end, or receiver section, such as a low noise block, tuners, and down converters; along with fast fourier transform (FFT) elements, spectrum shifters, channel state information (CSI) estimators, equalizers, demodulators, correlators, leak integrators and squarers is assumed. Further, other than the inventive concept, familiarity with processing signals, such as forming channel state information, is assumed and not described herein. Similarly, other than the inventive concept, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques (such as represented by matlab), which, as such, will not be described herein. In this regard, the embodiments described herein may be implemented in the analog or digital domains. Further, those skilled in the art would recognize that some of the processing may involve complex signal paths as necessary. Finally, like-numbers on the figures represent similar elements.

Figure 3:
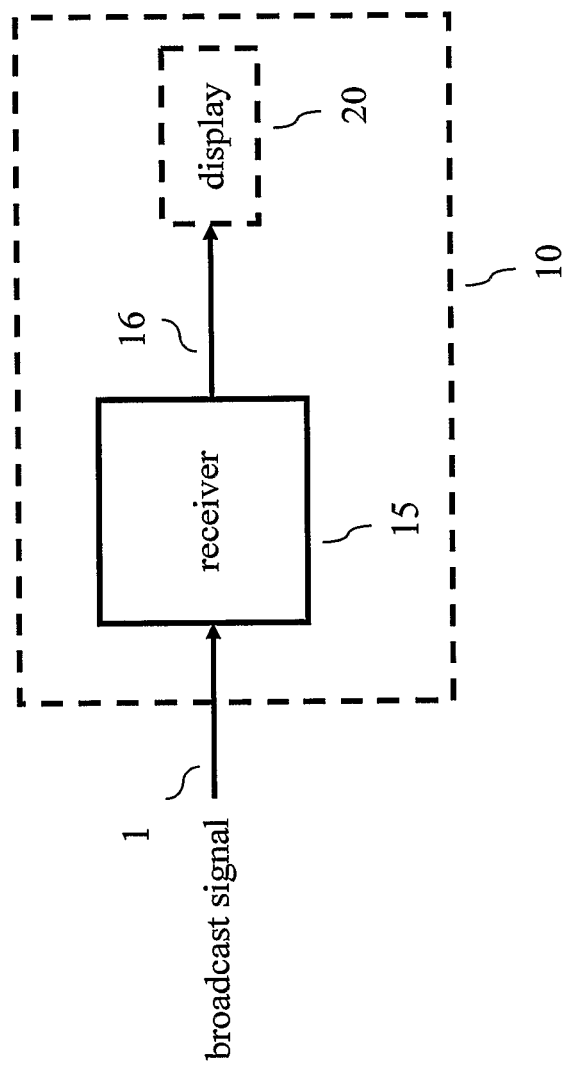
FIG. 3 shows an illustrative embodiment of an apparatus in accordance with the principles of the invention.

Referring now to FIG. 3, an illustrative embodiment of a device 10 in accordance with the principles of the invention is shown. Device 10 is representative of any processor-based platform, e.g., a PC, a server, a set-top box, a personal digital assistant (PDA), a cellular telephone, a mobile digital television (DTV), a DTV, etc. In this regard, device 10 includes one, or more, processors with associated memory (not shown) and also comprises receiver 15. The latter receives a broadcast signal 1 via an antenna (not shown)). For the purposes of this example, it is assumed that broadcast signal 1 is representative of a DVB-T/H service, i.e., a DTV transport stream, which includes video, audio and/or system information for at least one TV channel and that broadcast signal 1 conveys this information using at least a multi-carrier modulation such as orthogonal frequency division multiplexing (OFDM). However, the inventive concept is not so limited and is applicable to any receiver that processes OFDM-based signals. In accordance with the principles of the invention, receiver 15 performs phase error correction on a signal as a function of channel state information (CSI) and recovers therefrom output signal 16 for application to an output device 20, which may, or may not, be a part of device 10 as represented in dashed-line form. In the context of this example, output device 20 is a display that allows a user to view a selected TV program.

Figure 4:
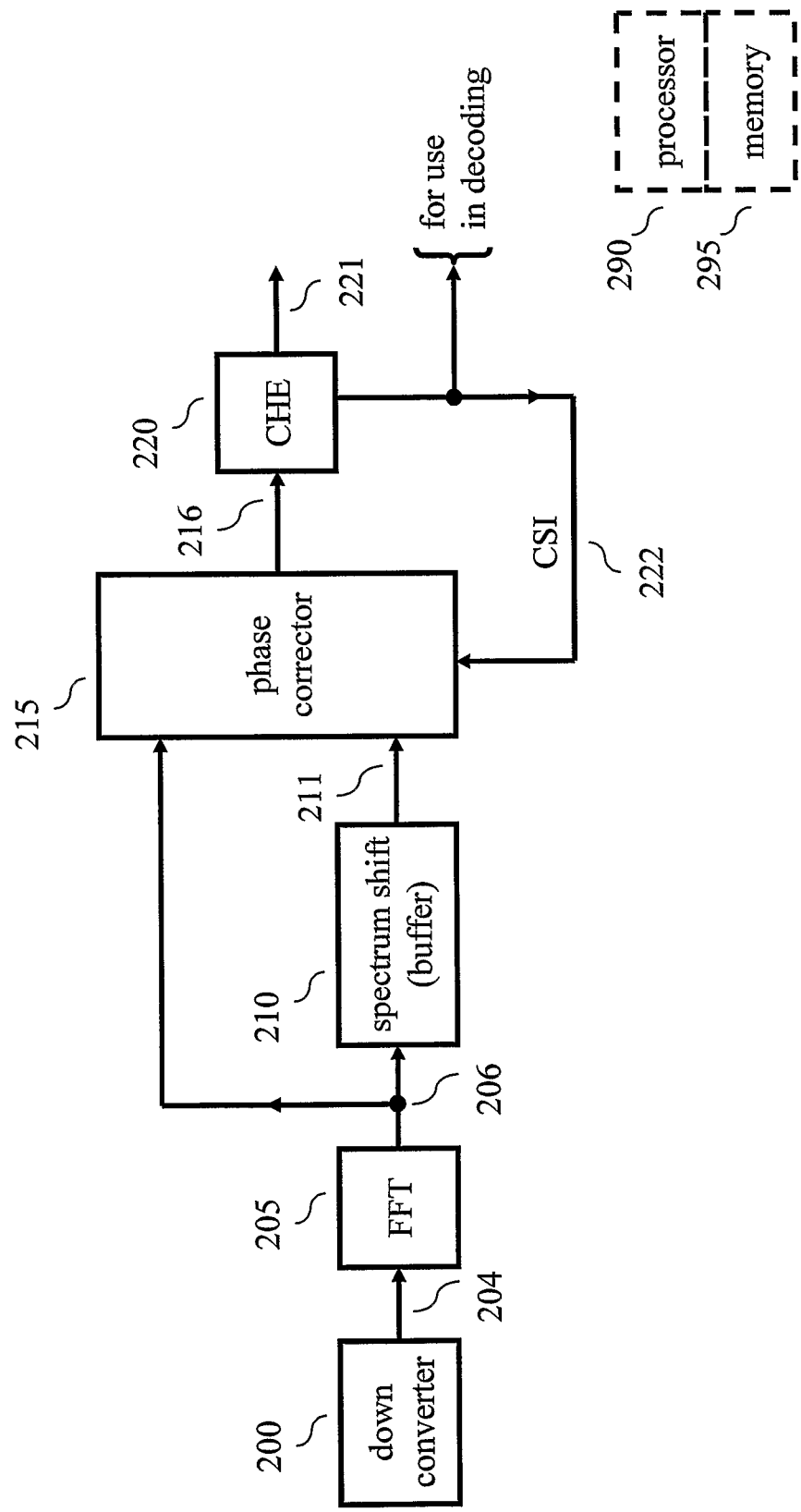
FIG. 4 shows an illustrative embodiment of a portion of a receiver in accordance with the principles of the invention.

Turning now to FIG. 4, an illustrative portion of receiver 15 is shown. Only that portion of receiver 15 relevant to the inventive concept is shown. Other than the inventive concept, the elements shown in FIG. 4 are known and not described herein. In this example, it is assumed that receiver 15 is operating in the 2K mode. It should be noted that operation in the 8K mode is similar and, as such, not described herein. Receiver 15 comprises downconverter 200, fast fourier transform (FFT) element 205, spectrum shift element 210, phase corrector 215 and channel estimation and equalizer (CHE) 220. In addition, receiver 15 is a processor-based system and includes one, or more, processors and associated memory as represented by processor 290 and memory 295 shown in the form of dashed boxes in FIG. 4. In this context, computer programs, or software, are stored in memory 295 for execution by processor 290. The latter is representative of one, or more, stored-program control processors and these do not have to be dedicated to the receiver function, e.g., processor 290 may also control other functions of receiver 15. For example, if receiver 15 is a part of a larger device, processor 290 may control other functions of this device. Memory 295 is representative of any storage device, e.g., random-access memory (RAM), read-only memory (ROM), etc.; may be internal and/or external to receiver 15; and is volatile and/or non-volatile as necessary.

FFT element 205 processes a received baseband signal 204. The latter is provided by downconverter 200, which is a part of a tuner (not shown) of receiver 15 tuned to a selected RF channel associated with broadcast signal 1 of FIG. 3. FFT element 205 transforms received baseband signal 204 from the time domain to the frequency domain and provides FFT output signal 206 to spectrum shift element 210. It should be noted that FFT output signal 206 represents complex signals having in-phase and quadrature components. Typically, FFT element 205 performs butterfly calculations as known in the art and provides reordered output data (2048 complex samples in an 8k mode of operation). As such, spectrum shift element 210 further processes FFT output signal 206 to rearrange, or shift, the FFT output data. In particular, spectrum shift element 210 buffers one OFDM symbol and tidies the subcarrier locations to comply with the above-mentioned DVB-T standard and also shifts the subcarriers from [0, 2π] to [−π, +π] to provide spectrum shifted signal 211. In accordance with the principles of the invention (described further below), phase corrector 215 processes spectrum shifted signal 211 to remove any phase offsets, e.g., those associated with CPE, and provides a phase corrected signal 216 to CHE element 220. CHE element 220 processes the phase corrected signal 216 for (a) determining channel state information (CSI) for providing CSI signal 222; and (b) equalizing the received baseband signal to compensate for any transmission channel distortion for providing equalized signal 221. As known in the art, CSI signal 222 may be used for obtaining bit metrics for use in decoding (not shown in FIG. 4). However, and in accordance with the principles of the invention, CSI is also used to correct for phase error. Finally, equalized signal 221 is further processed (not shown) by receiver 15 to, e.g., recover content conveyed therein (audio, video, etc.) (e.g., see output signal 16 of FIG. 3).

Figure 5:
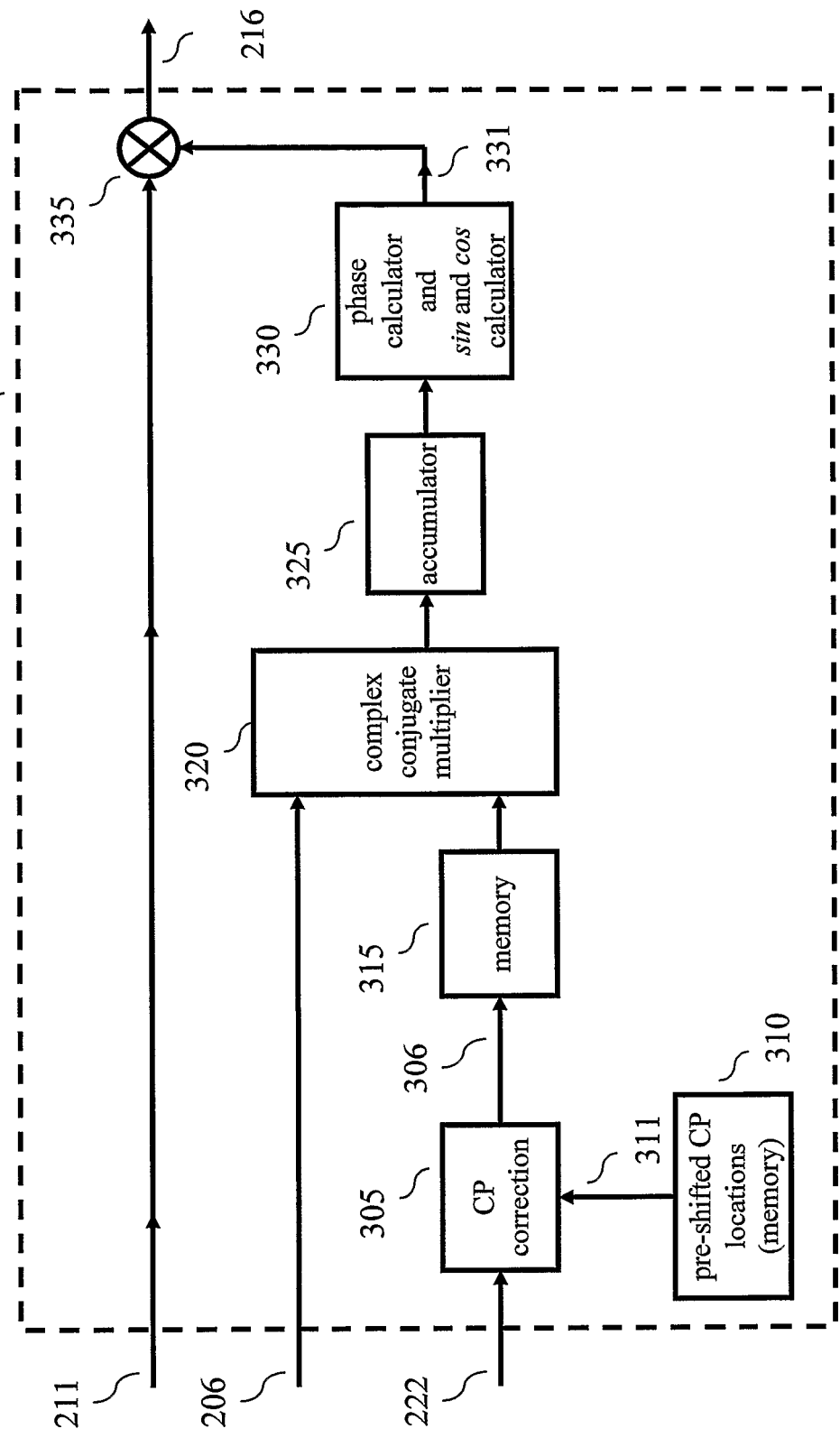
FIG. 5 shows an illustrative embodiment of phase corrector 215 in accordance with the principles of the invention.

Attention should now be directed to FIG. 5, which shows an illustrative embodiment of phase corrector 215 in accordance with the principles of the invention. Phase corrector 215 comprises CP correction element 305, pre-shifted CP location element 310, memory 315, complex conjugate multiplier 320, accumulator 325, phase calculator and sin and cos calculator 330 and rotator (or multiplier) 335. Other than the inventive concept, the elements shown in FIG. 5 are known and not described herein. At the outset, it should be noted that the inventive concept takes advantage of the fact that spectrum shift element 210 already buffers an OFDM symbol. In particular, and as can be observed from FIG. 5, phase corrector 215 uses FFT output signal 206 for estimating the phase error and corrects spectrum shifted signal 211 for the phase error. Thus, an advantage of the invention is that it can be implemented in such a way that a receiver requires less memory—and less cost.

With regard to correcting for the phase error, and as mentioned just above, phase corrector 215 corrects the phase of spectrum shifted signal 211. In particular, spectrum shifted signal 211 is applied to rotator 335 along with a phase error estimate signal 331. Rotator 335 corrects for the phase error, e.g., the CPE, by rotating spectrum shifted signal 211 in the opposite direction in accordance with phase error estimate signal 331 to provide phase corrected signal 216. Ideally, phase error estimate signal 331 corrects for substantially all of the phase error, i.e., at least some, if not all, of the phase error is removed from the signal via rotator 335. As used herein, any references to removing phase error means to at least reduce, if not eliminate, the phase error.

With regard to estimating the phase error, and as mentioned just above, phase corrector 215 uses FFT output signal 206 for estimating the phase error. However, as noted earlier, FFT element 205 of FIG. 4 performs butterfly calculations as known in the art and provides reordered output data (2048 complex samples in a 2k mode of operation). As a result, any use of the CP locations as defined in DVB-T with respect to FFT output signal 206 need to be further adjusted to take into account this FFT reordering. Thus, pre-shifted CP location element 310 stores pre-shifted CP values, which are shown in Table Four of FIG. 16. These CP values are "pre-shifted" in the sense that this is the location of the CPs as defined in DVB-T but with respect to the ordering provided by FFT element 205. In particular, for an FFT, such as represented by FFT element 205 in the 2k mode of operation, an associated spectrum shift index table is known. An illustrative spectrum shift index table for a 2k mode of operation is shown in Table One in FIGS. 6-14. For example, for a sample index, k, where 1≤k≤2048, FIG. 6 illustrates the first 240 spectrum shift frequency values for the first 240 k values of FFT element 205. In particular, at k=1, the associated spectrum shift index value has a frequency value of 1024; while at k=16, the associated spectrum shift index value has a frequency value of 832 and at k=240, the associated spectrum shift index value has a frequency value of 884, and so on, through the spectrum shift frequency value of 1023 at k=2048 shown in FIG. 14. Thus, in view of Table One, it is possible to shift the CP locations as defined in DVB-T to their location in FFT output signal 206. This is illustrated in Tables Two, Three and Four of FIGS. 15 and 16.

Figure 15:

Table Two of FIG. 15 simply shows the subcarrier locations of the 45 CPs as currently defined in DVB-T in the 2k mode of operation. For example, see p. Table 7, p. 29, of the above-mentioned DVB-T standard. Thus, as shown in Table Two, the first CP occurs as a subcarrier value of 0, etc. However, in DVB-T, although there are 2048 subcarriers, only 1705 subcarriers are actually active. There are 172 inactive subcarriers preceding the active subcarriers and 171 inactive subcarriers following the active subcarriers. This is illustrated by OFDM symbol 81 of FIG. 15 (not to scale). In this regard, since phase corrector 215 is estimating the phase error from FFT output signal 206—and not spectrum shifted signal 211—all of the 2048 subcarriers must be taken into account. Therefore, Table Two must first be translated into Table Three, where each of the values of Table Two are shifted by 172. As illustrated by dotted line 91, the active subcarrier CP located at 0 actually corresponds to subcarrier 172, when the inactive subcarriers are taken into account. From the values of Table Three, and given the spectrum shift index values shown in Table One of FIGS. 6-14, it is possible to now calculate the pre-shifted locations of the all the CPs, i.e., their locations in FFT output signal 206. The results of this calculation are shown in Table 4 of FIG. 16 for the 2k mode of operation for the forty-five CPs. For example, the CP located at subcarrier 976 is associated with sample number 63 (starting from 0), as illustrated by dotted line 92. This can be verified from Table 1, which starts from k=1, where it can be observed from FIG. 6 that k=64 is associated with subcarrier 976. Likewise, and as illustrated by dotted line 93, the CP located at subcarrier 1141 is sample number 744 (again, starting from 0) (e.g., see Table 1, FIG. 9, k=745). Turning briefly to FIG. 17, an illustrative matlab program for converting Table 2 into Table 3 and then forming Table 4 from Table 3 in accordance with Table 1 is shown. As a result, pre-shifted CP location element 310 stores the CP locations as defined in Table Four of FIG. 16.

Figure 1:
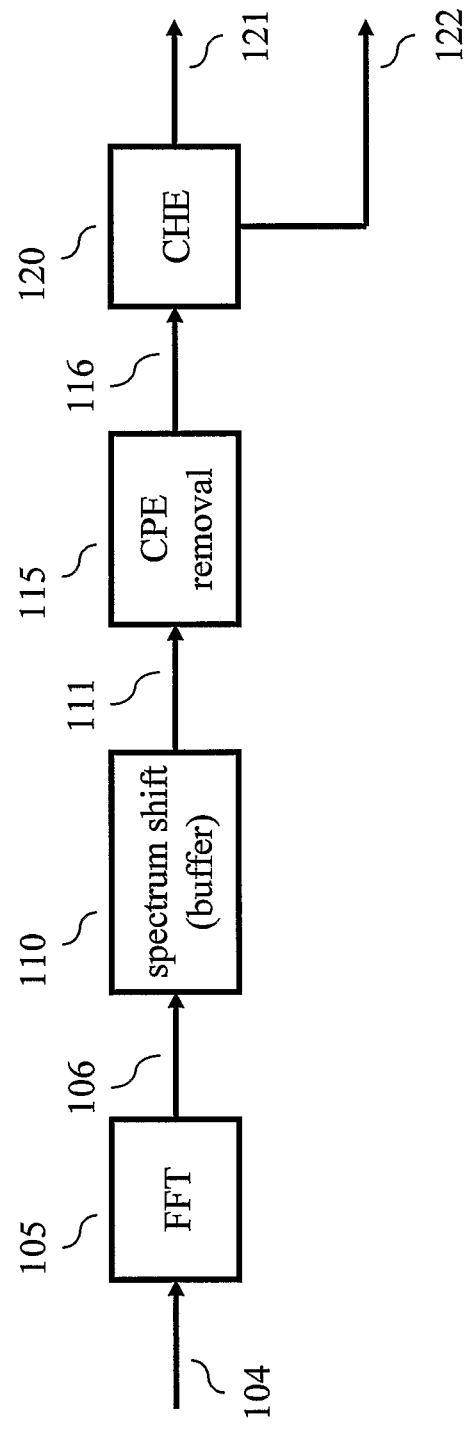
FIGS. 1 and 2 show prior art common phase error removal.
Figure 2:
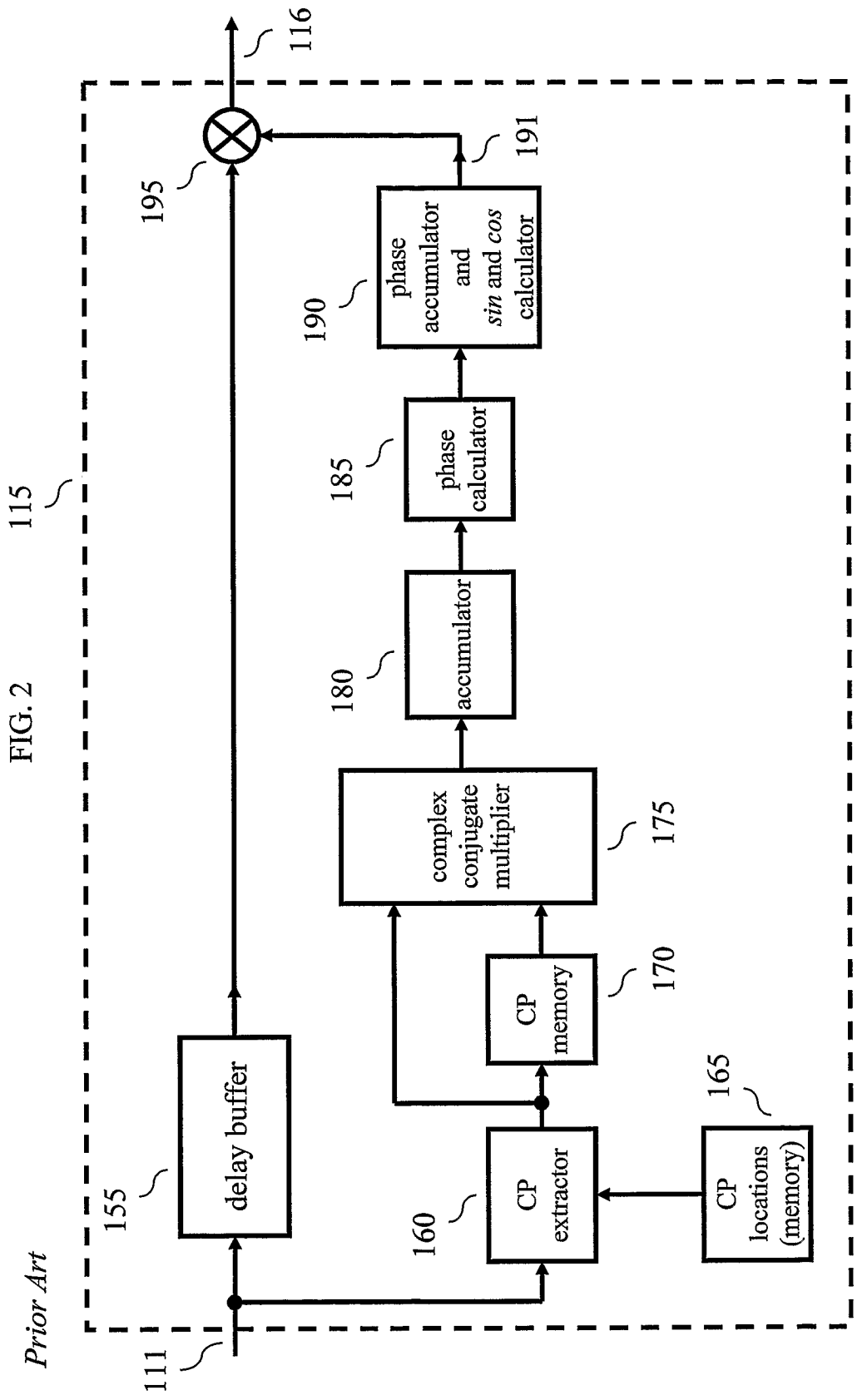

For each CP, corresponding sample values of the associated pre-shifted CP are provided to CP correction element 305 from memory 310. (It should be recalled that each CP has a given amplitude and phase.) CP correction element 305 modifies, or corrects, each CP value, e.g., a phase value, in accordance with the CSI information provided from CHE 220 via CSI signal 222. Other than the inventive concept, CSI information is known in the art and not described herein. Generally speaking, the CSI information takes into account the reliability of each of the subcarriers as affected by the transmission channel. In accordance with the principles of the invention, by correcting the pre-shifted CP values to take into account the channel response information, the channel effects can be eliminated during the phase error removal processing, and, as a result, it is possible to obtain good estimation performance. CP correction element 305 provides the resulting CSI-CP sequence 306 to memory 315 for storage. Complex conjugate multiplier 320 multiplies the complex conjugates of the stored CSI-CP sequence (from memory 315) with FFT output signal 206. The resulting products are averaged (via accumulator 325) for each OFDM symbol. Phase calculator and sin and cos calculator 330 further calculates an estimate of the phase error and generates in-phase and quadrature values to provide phase error estimate signal 331, which is applied to rotator 335 to correct for phase error in the signal. It should be observed that the phase error correction element illustrated in FIG. 5 cross correlates the CSI-CP sequence with FFT output signal 206 (versus the auto correlation technique between time shifted samples of the same signal as illustrated in the conventional technique of FIG. 2).

Figure 18:
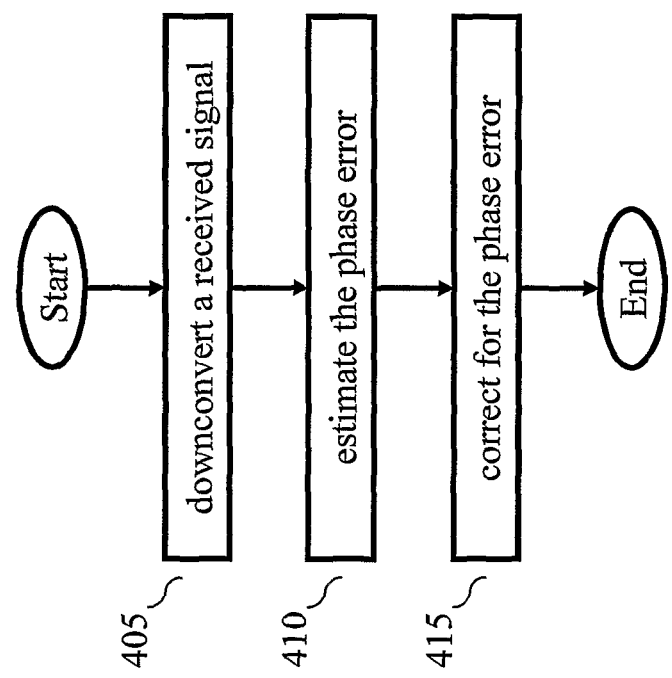

Turning now to FIGS. 18 and 19, illustrative flow charts for use in a receiver for performing phase error correction in accordance with the principles of the invention are shown. In step 405, a receiver downconverts a received broadcast signal (e.g., receiver 15 of FIG. 3). In step 410, the receiver estimates the phase error in the downconverted signal in accordance with the principles of the invention. And, in step 415, the receiver corrects the downconverted signal for the estimated phase error.

Step 410 of FIG. 18 is shown in more detail in the flow chart of FIG. 19. In step 505, the receiver retrieves pre-shifted CP locations (e.g., from a memory as represented by element 310 of FIG. 5). In step 510, the receiver corrects the pre-shifted CPs with CSI to provide a CSI-CP sequence, i.e., a sequence of corrected pre-shifted CP values. In step 515, the CSI-CP sequence is cross-correlated with the FFT output signal (representative of the downconverted signal), the results of which are used to determine an estimate of the phase error in step 520.

As described above, and in accordance with the principles of the invention, a receiver performs phase error correction on a signal, e.g., as a result of CPE, as a function of channel state information (CSI). In this regard, at least two advantages can be observed in comparison to the conventional CPE removal element 115 of FIG. 2. First, as compared to FIG. 2, a separate delay buffer 155 for the OFDM symbol is not needed. Thus, the inventive concept significantly reduces memory requirements, especially for the 8k mode of operation. Second, as compared to FIG. 2, the phase accumulator function of element 190 is not needed. Thus, the inventive concept further simplifies phase error processing. However, the inventive concept is not so limited and those skilled in the art can construct phase error removal elements in accordance with the principles of the invention without taking advantage of these benefits, e.g., by including an OFDM symbol buffer.

Further, it should be noted that the inventive concept is not limited to correcting for just one type of phase error such as CPE. In addition, it should be noted that although the inventive concept was illustrated in the context of a DTV-T broadcast signal, the inventive concept is not so limited and is applicable to other types of receivers that perform OFDM reception, such as a software defined radio receiver, a DMB-T/H receiver, etc.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, any or all of the elements may be implemented in a stored-program-controlled processor, e.g., a digital signal processor, which executes associated software, e.g., corresponding to one, or more, of the steps shown in, e.g., FIGS. 18-19, etc. Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. A method for use in a receiver, the method comprising:
   receiving a signal, the signal representing an orthogonal frequency division multiplexed OFDM signal; and
   performing phase error correction on the signal as a function of channel state information (CSI) for providing a phase corrected signal, wherein the performing phase error correction step comprises:
   modifying pre-shifted continual pilots (CPs) as a function of the CSI to provide a pre-shifted CP-CSI sequence;
   cross-correlating fast fourier transform (FFT) output data representative of the signal with the pre-shifted CP-CSI sequence to provide cross-correlation results;
   determining a phase error from the cross-correlation results; and
   correcting a phase of the signal in accordance with the determined phase error.

2. The method of claim 1, further comprising:
   downconverting a received radio frequency signal for providing a downconverted signal;
   performing a fast fourier transform (FFT) on the downconverted signal for providing an FFT output signal; and
   spectrum shifting the FFT output signal for providing the signal.

3. The method of claim 2, wherein the performing phase error correction step comprises:
   determining the phase error from the FFT output signal as a function of the CSI.

4. The method of claim 3, wherein the correcting step includes the step of:
   rotating the signal in accordance with the determined phase error.

5. The method of claim 3, wherein the phase error is representative of a common phase error.

6. The method of claim 1, further comprising the steps of:
   processing the phase corrected signal for providing the CSI information.

7. The method of claim 1, further comprising the steps of:
equalizing the phase corrected signal to provide an equalized signal in such a way that CSI information is generated.

8. The method of claim 1, wherein the correcting step includes the step of:
rotating the signal in accordance with the determined phase error.

9. An apparatus comprising:
a processor operative on a first signal that is representative of a fast fourier transform (FFT) of a received orthogonal frequency division multiplexed (OFDM) signal for estimating a phase error as a function of channel state information (CSI) and for providing a phase corrected signal in accordance with the estimated phase error; and
a memory for storing locations of pre-shifted continual pilots (CPs) in the first signal;
wherein the processor (a) forms modified CPs corresponding to the stored locations in accordance with the CSI and (b) cross correlates the modified CPs with the first signal for estimating the phase error.

10. The apparatus of claim 9, wherein the estimated phase error is representative of a common phase error.

11. The apparatus of claim 9, wherein the processor processes the phase corrected signal for determining the CSI information.

12. The apparatus of claim 9, wherein the processor equalizes the phase corrected signal in such a way that CSI information is generated.

13. An apparatus comprising:
a fast fourier transform (FFT) for providing an FFT output signal comprising a number of samples;
a spectrum shifter for reordering the samples in the FFT output signal to provide a spectrum shifted signal; and
a phase corrector responsive to channel state information (CSI) for estimating a phase error from the FFT output signal and for correcting a phase of the spectrum shifted signal in accordance with the estimated phase error, wherein the phase corrector comprises:
a memory for storing locations of pre-shifted continual pilots (CPs) in the FFT output signal;
a memory for storing modified pre-shifted CPs, wherein the modified pre-shifted CPs are derived from the pre-shifted CPs and CSI; and
a cross correlator for use in estimating the phase error, wherein the cross correlator cross correlates the modified pre-shifted CPs with the FFT output signal.

14. The apparatus of claim 13, wherein the phase corrector comprises a rotator for correcting the phase of the spectrum shifted signal in accordance with the estimated phase error.

15. The apparatus of claim 13, further comprising:
an equalizer for equalizing the phase corrected spectrum shifted signal and for providing the CSI.

16. The apparatus of claim 13, wherein the phase error is representative of a common phase error.

* * * * *